C. MARÉ.
Preserving Fish.

No. 225,938. Patented Mar. 30, 1880.

Witnesses
John C. Tunbridge.
Willy G. E. Schultz.

Inventor:
Charles Maré
by his attorney
A. v. Briesen

UNITED STATES PATENT OFFICE.

CHARLES MARÉ, OF NANTES, FRANCE.

PRESERVING FISH.

SPECIFICATION forming part of Letters Patent No. 225,938, dated March 30, 1880.

Application filed November 22, 1879. Patented in France September 22, 1874.

*To all whom it may concern:*

Be it known that I, CHARLES MARÉ, of Nantes, France, have invented an Improved Process for Preserving Fish; and I do hereby declare that the following is a full, clear, and exact description of the same.

My invention has for its object to provide an improved process of packing sardines and other fish.

Figure 1:
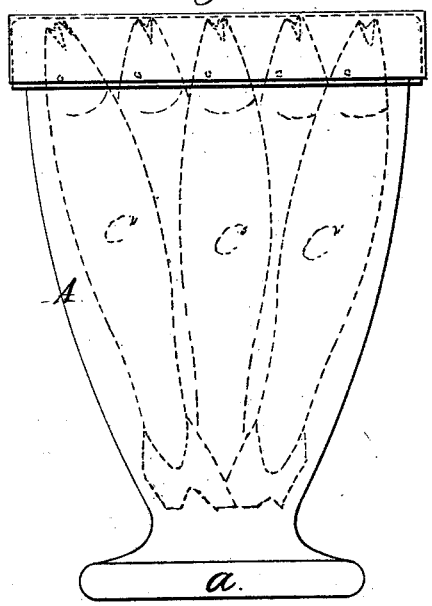
Figure 2:
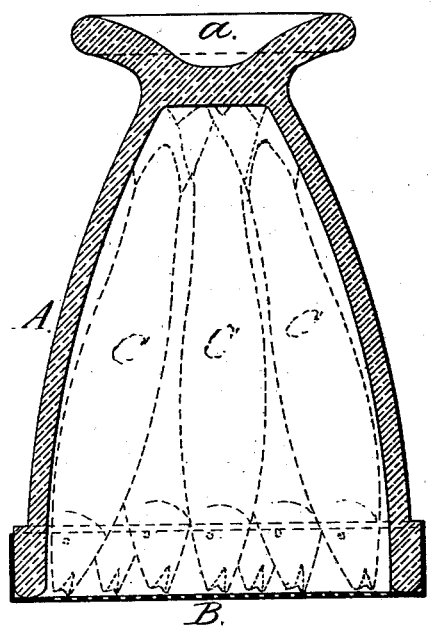
Figure 3:
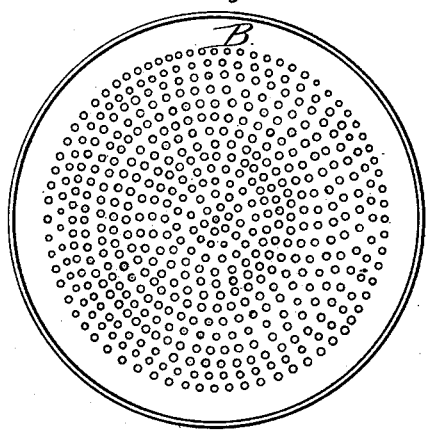

Figure 1 is a side elevation of the receptacle for sardines. Fig. 2 is a vertical section of the receptacle in an inverted position, arranged for draining the fish; and Fig. 3 represents a perforated plate which is used when the fish are being drained.

Referring to the drawings, A is the receptacle or box for the fish. This receptacle may be made of any suitable material, such as glass, metal, or pottery. It is to be made of semi-ovoid form, and provided with a base, *a*. This form is used for the purpose of permitting the fish to be packed in a way that will admit of their being subjected to the improved process of preserving them.

B is a foraminated plate which is adapted to be placed over the top of receptacle A.

The fish C are packed in the receptacle A with all of their tails downward, as shown. They are packed in this manner after they have been cooked in oil and before draining the oil from them. After being thus packed, the foraminated plate B is placed over the top of the receptacle A, which is thereupon placed in an inverted position on the draining-board. The oil used in cooking the fish, as well as the natural oil, drains from the fish and passes through plate B. Said plate serves to keep the fish in the receptacle while being drained. After the draining is completed the receptacle is turned right end up, the plate B is removed, and the receptacle is filled with packing, such as olive-oil, when it is ready to be sealed.

The advantages of this invention are numerous and important. In the first place, by packing them in a receptacle of the described shape I am enabled to pack them with their tails downward, so that by inverting them the oil can be thoroughly drained from them. This cannot be done in the mode of packing them heretofore employed by placing the fish horizontally or vertically, head to tail, in rectangular boxes and in bottles. The oil, when such a mode of packing is practiced, cannot flow freely from the fish, and the result is that much of it remains in the receptacle and spoils the sweetness and delicacy of flavor of the fish and discolors the packing-oil. But by my improved mode of packing the fish, as above described, all of the oil is removed. Consequently the fish acquire and retain a very superior flavor and appearance.

I claim—

The process of packing fish which consists in first boiling the fish in oil, then placing the fish undrained in a packing-vessel, tails downward, and with their heads next to the open end or mouth of the receptacle, then draining the fish of the cooking-oil, filling the receptacle with packing-oil, and sealing the receptacle, substantially as described.

CHARLES MARÉ.

Witnesses:
 JULES CADECEAU,
 GEORGE GIFFORD.